Patented Apr. 16, 1935

1,998,384

UNITED STATES PATENT OFFICE 1,998,384

PROCESS FOR PRESERVING FRESH VEGETABLES IN THE RAW STATE

Julien Petitpas, Paris, France

No Drawing. Application October 15, 1931, Serial No. 569,118. In France December 17, 1930

5 Claims. (Cl. 99—5)

The object of my invention is a process for preserving fresh vegetables and other similar products in the raw state.

When allowed to desiccate in a natural way, vegetables, green peas for example, pass through an ageing transformation, viz., their colouring is altered, they grow hard without a substantial variation in volume and their cooking properties are completely modified. From all the studies that have been made on this subject, it has been ascertained that this ageing transformation results from oxidation and hydrolysis.

According to my invention, vegetables and other similar products are so treated as to avoid these two phenomenons, both during the preserving treatment and after.

To this effect, these raw products are subjected to a desiccation in a vacuum, at a low temperature, after which they are agglomerated under high pressure.

Vegetables thus treated preserve the qualities of fresh raw vegetables. Their vitamines are not destroyed. They require no metal box, no container the fluid-tightness of which is always doubtful, the agglomerated products thus obtained merely requiring to be wrapped up. When plunged in water, said agglomerated product disintegrates, the vegetables swell and recover the appearance of the natural product; they can then be treated as such.

Desiccation in a vacuum, at a low temperature must be pursued until the treated product contains only from 5 to 10 per cent water approximately, this percentage of water corresponding to the state of equilibrium. Said amount of water must be neither substantially smaller than the percentage above stated, nor substantially greater than it; otherwise, the compression which follows the desiccation, and which takes place, on an average, at a pressure of 300 kgs. per cm² would not produce an agglomerated product sufficiently dense and resistant, both from the mechanical point of view, and from that of preservation.

The agglomeration of many more or less mucilaginous products may be obtained merely through compression. But, in some cases, for instance in the case of green peas, it is preferable to subject the material to a previous coating by means of a starchy or gummy product which may be of any type whatever, provided it is edible. The percentage of this product must not exceed approximately 0.2 to 0.3 per cent of the weight of the dry product, that is from two to three grammes per kilogramme of dehydrated vegetable product, or still, less than 0.5 gramme of said sticky product per kilogramme of natural vegetable material.

Eventually, the products to be preserved may be subjected to various other preliminary treatments, such as: slicing, partial desiccation, refrigeration. The essential point is that the final drying process should take place in a vacuum, at a low temperature, and should be pursued up to the above indicated limit and followed by a strong compression. The process according to my invention is applicable to fruits as well as to vegetables, the degree of compression varying according to the nature of the product that is to be treated.

The following example concerns the treatment of green peas:

The peas, after being shelled, are spread on basins of sheet iron, or better still, on pieces of cloth stretched on suitable frames, which are placed in a chamber where a vacuum can be established, said chamber being heated at a temperature of about 70° C. by a current of steam flowing through the walls of said chamber. Vacuum is produced to a pressure of 25 mm. of mercury. If the peas are very small, the temperature is allowed to drop about two hours later. If they are coarse, the temperature is maintained for 5 to 7 hours. If the peas treated are of miscellaneous sizes, it is advisable to separate them by means of an appropriate sieve, into three lots of corresponding sizes, which may be treated accordingly.

After treatment in a vacuum, the peas have lost about 30% of their weight. They are allowed to further desiccate in the open air, if the weather is dry, or in case of damp or cold weather, in a very slightly warmed (25°) oven. A few hours later on, the weight will have dropped from 20 to 25% of the initial weight. According to the origin of the peas it may be necessary to coat them or not. In the first case, the peas are placed in a simple box into which is introduced a solution of an edible gum: arabic, dragon, or other gum to the amount of about 3 gr. of gum per kg. of dried peas, said 3 gr. of gum being dissolved in about ten to twelve times their weight of water. The product is then compressed in a press provided with honey comb recesses or with moulds, at the rate of 300 kgs. per square centimeter.

What I claim is:

1. A process of preserving fresh vegetables and other similar products in the raw state, which comprises subjecting said vegetables in the undivided state to a first step of desiccation in a high vacuum at a low temperature, subjecting the resulting product to a desiccation in air at a pressure substantially equal to the atmospheric pressure and at a moderate temperature, and agglomerating the resulting product under a high pressure..

2. A process of preserving fresh vegetables and other similar articles in the raw state, which comprises subjecting said vegetables in the undivided state to a first step of desiccation in a high vacuum at a low temperature, subjecting the resulting product to a complementary desiccation in an oven at a temperature of about 25° C., and finally agglomerating the resulting product under a high pressure.

3. A process of preserving fresh vegetables and other similar products in the raw state, which comprises subjecting said vegetables in the undivided state to a first step of desiccation in a vacuum corresponding to a pressure of about 25 mm. of mercury, at a temperature of about 70° until they have lost about 30 per cent of their weight, subjecting the resulting product to a complementary desiccation in the presence of air at a pressure substantially equal to atmospheric pressure and at a moderate temperature until the weight of the product has dropped to about 20 to 25% of the initial weight, and finally agglomerating the resulting product under a pressure of about 300 kgs. per square centimeter.

4. A process of preserving fresh vegetables and other similar products in the raw state, which comprises, subjecting said vegetables in the undivided state to a first step of desiccation in a vacuum at a temperature of about 70° C., until they have lost about 30 per cent of their weight, subjecting the resulting product to a complementary step of desiccation in the presence of air at a pressure substantially equal to atmospheric pressure and at a temperature of about 25° C. until the weight of the product has dropped to about 20-25 per cent of the initial weight, and finally agglomerating the resulting product under a high pressure.

5. A process of preserving fresh vegetables and other similar products in the raw state, which comprises, subjecting said vegetables in the undivided state to a first step of desiccation in a vaccum at a temperature of about 70° C. until they have lost about 30 per cent of their weight, subjecting the resulting product to a complementary step of desiccation in the presence of air at a pressure substantially equal to atmospheric pressure and at a temperature of about 25° C. until the weight of the product has dropped to about 20-25 per cent of the initial weight, coating the product obtained with a sticky product of the edible kind, and finally agglomerating the whole under a high pressure.

JULIEN PETITPAS.